H. SAYLES.
FLY TRAP.
APPLICATION FILED JAN. 5, 1910.
988,146.
Patented Mar. 28, 1911.
2 SHEETS—SHEET 1.
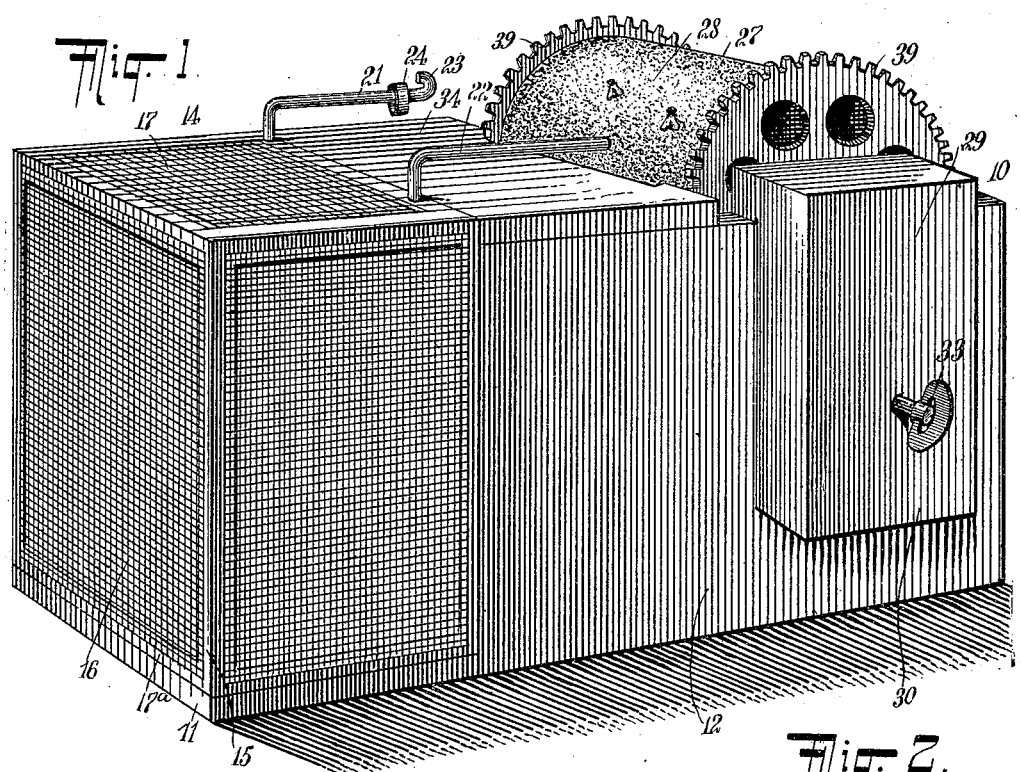
Fig. 1
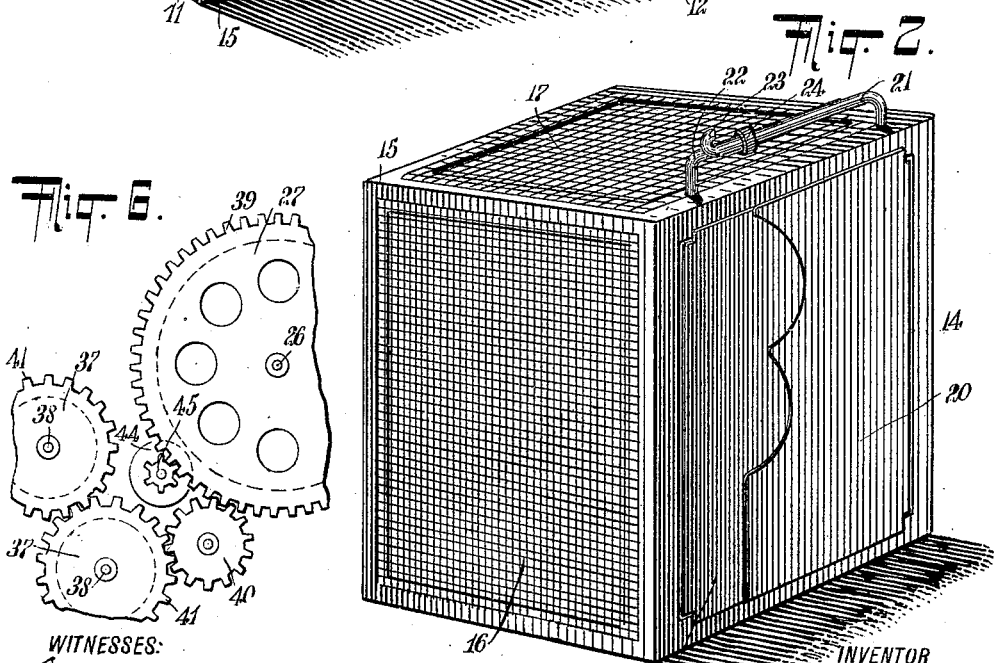
Fig. 6.
Fig. 2.
WITNESSES:
George Bamber
John K. Brachvogel
INVENTOR
Henry Sayles
BY
Munn & Co.
ATTORNEYS

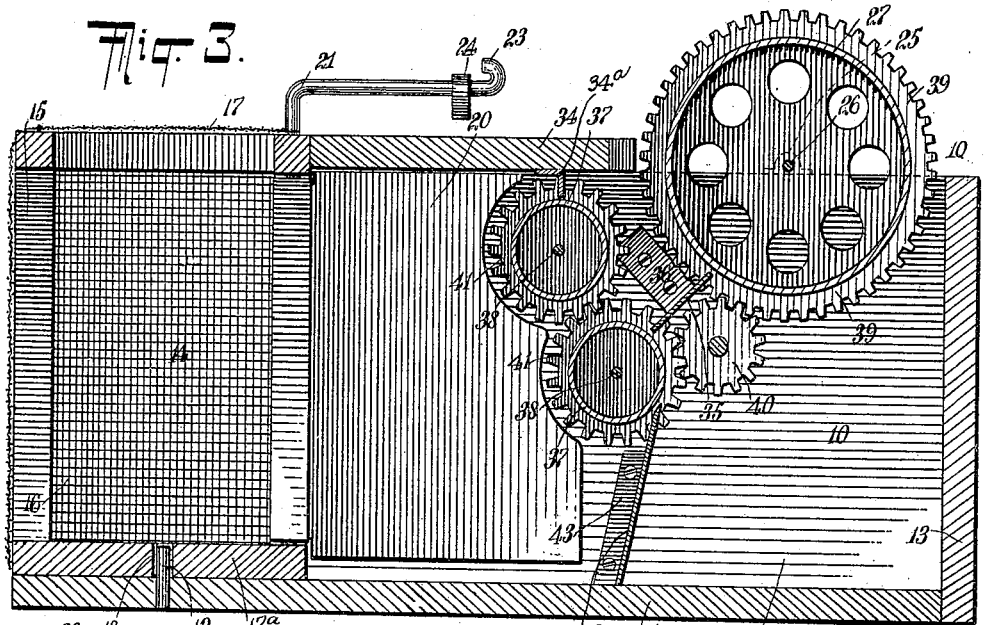
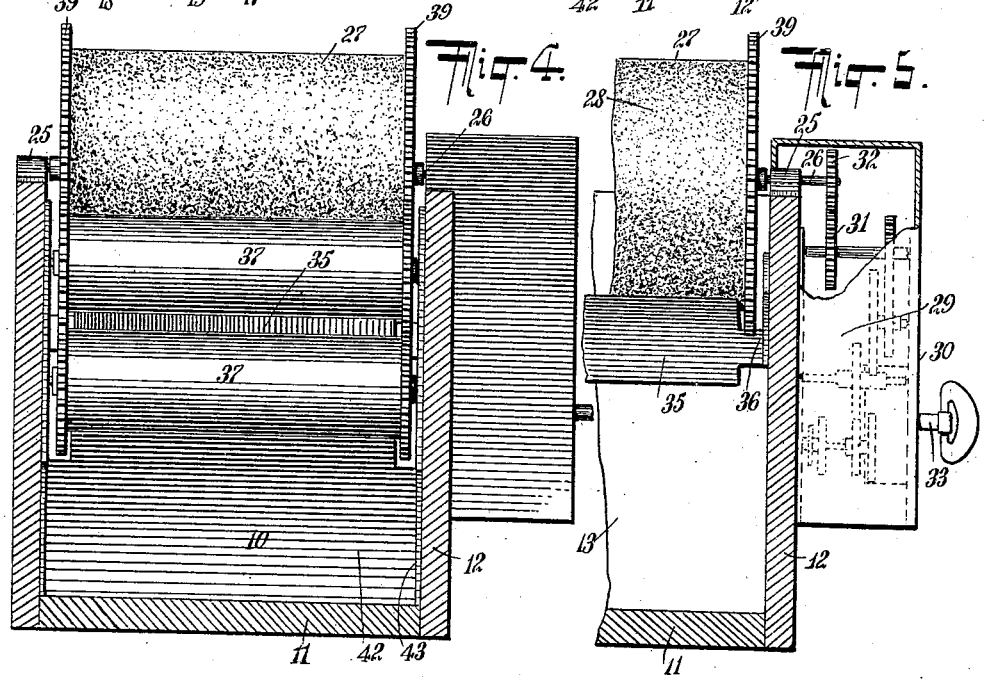

UNITED STATES PATENT OFFICE.

HENRY SAYLES, OF NEW YORK, N. Y.

FLY-TRAP.

988,146.

Specification of Letters Patent. Patented Mar. 28, 1911.

Application filed January 5, 1910. Serial No. 536,475.

*To all whom it may concern:*

Be it known that I, HENRY SAYLES, a citizen of the United States, and a resident of the city of New York, Fordham, borough of the Bronx, in the county and State of New York, have invented a new and Improved Fly-Trap, of which the following is a full, clear, and exact description.

This invention relates to traps for catching flies or other insects and the like, and has reference more particularly to a device of the class described, comprising a casing, a movable member adapted to attract flies and to carry them to a predetermined point, a cage, and means for dislodging the flies from the first-mentioned member and for directing them into the cage.

The object of the invention is to provide a simple, inexpensive and durable trap for catching flies or other insects, which provides a cage for holding the flies when caught, which constitutes a lure to attract the flies, which is automatic in operation, which is small and compact in form and can be easily carried from place to place, and in which the fly-alluring and carrying member is driven by a suitable motor so that the flies, after they alight upon the member, are carried into the casing and directed toward the cage, thereby obviating the possibility of their escape.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of an embodiment of my invention; Fig. 2 is a perspective view of the cage of the fly-trap, showing the same removed from the casing; Fig. 3 is a longitudinal section of the device; Fig. 4 is a transverse section of the fly trap; Fig. 5 is a partial, transverse section of the trap, showing different parts; and Fig. 6 is an end view of certain of the members of the fly trap, showing a part of modified form.

Before proceeding to a more detailed explanation of my invention, it should be clearly understood that while the same is particularly useful for catching flies, it can be used for a similar purpose in connection with other insects and the like. The member upon which the flies alight, and which carries them into the casing of the trap, may be provided with a suitable surface coating which acts as a lure. This coating may consist of sugar, or any other material adapted for the purpose. I have shown for example herewith, a spring-actuated motor for driving the above-mentioned member. Any other device adapted for the purpose can also be employed, for example, an electric motor.

Certain of the details of construction form no part of the invention, and can be varied in accordance with individual preference and special conditions, without departing from the underlying spirit of the invention.

Referring more particularly to the drawings, I provide a casing 10, consisting of a bottom 11, side walls 12, and an end wall 13. The bottom is extended at one end beyond the extremities of the side walls remote from the end wall 13, and has removably mounted thereon a cage 14, consisting of a frame 15, having walls 16 and a top 17, of suitable reticulate material such as wire screen. The cage has a bottom 17$^a$ mounted upon the extended part of the bottom 11 and provided with an opening 18, which receives a stud 19, carried by the bottom 11, so that the cage can be removably held in position. At the side adjacent to the side walls of the casing, the cage has swinging doors 20, which open outward and have laterally disposed arms 21 and 22, by means of which they can be manipulated. One of the arms has a rearwardly disposed end 23, and loosely carries a ring 24, which can be slipped over the arm 22 when the arms are in juxtaposition, to hold the doors closed, as is shown most clearly in Fig. 2.

The side walls 12 of the casing have bearings 25, in which is journaled a shaft 26, carrying a cylindrical member 27, which has the surface 28 coated with sugar or other alluring material to attract the flies. A suitable spring motor 29 having a casing 30, is mounted upon one of the side walls 12 and has a driving pinion 31, in mesh with a second pinion 32, rigid with the shaft 26, so that the motor serves to actuate the member 27. The motor may be of any suitable form and is preferably wound by means of a key 33.

The member 27 is arranged close to one end of the casing, and between it and the cage is a removable top 34, for the casing, which extends close to the member 27 but is spaced therefrom sufficiently to permit flies carried by the member to pass into the casing. Within the latter is a dislodging member 35, extending across the casing, between the side walls and secured to said walls by means of laterally disposed toes 36. The dislodging member presents an edge close to the member 27, within the casing, and serves to remove flies or other insects clinging thereto.

Within the casing, under the top 34, are journaled two rollers 37, having shafts 38 mounted in suitable bearings of the side walls 12 of the casing. At each end, the member 27 carries a gear wheel 39, in mesh with a pinion 40, journaled upon a side wall 12 of the casing. The rollers 37 have gear wheels 41, which are in mesh. The gear wheels 41 of the lower roller also mesh with the pinions 40, so that the rollers are driven simultaneously with the member 27. The rollers are spaced apart, so that flies dislodged from the member 27 pass therebetween and are advanced thereby to the cage 14. Underneath the lower roller 37 is mounted a partition 42, extending from one of the side walls 12 to the opposite side wall, and secured thereto by oppositely disposed flanges 43. If so desired, the rollers 37 may also be covered with an alluring coating. It may be found sufficient to provide the gear wheels 39 and 41 at one side only, a single pinion 40 being then employed. Under the top 34 is a depending strip or partition 34ª, which prevents the escape of flies above the upper roller 37.

The doors 20 of the cage are suitably cut away, so that they can be arranged at the sides 12 of the casing and extend close to the rollers 37. The inside parts of the casing are preferably painted black, so that the flies when once within the cage will tend to remain therein.

In the modified form of the device shown in Fig. 6, the dislodging member 35 is dispensed with and a dislodging roll 44 is employed, which is provided with a small pinion 45, in mesh with one of the gear wheels 39 of the member 27. It will be understood that the rollers 37 and the dislodging roller 44, revolve at much higher rates of speed than does the member 27, so that when a fly alights upon one of the rollers 37 it is practically impossible for it to escape, and it is surely directed toward the cage.

Having thus described my invention, I claim as new, and desire to secure by Letters Patent:—

1. A device of the class described, comprising a casing, movable members for successively carrying flies to a predetermined part of said casing, and operable at successively increasing speeds, a cage, and means for dislodging the flies from said members, and for directing them into said cage.

2. A device of the class described, comprising a casing, a plurality of rotatable members carried thereby, a cage, gearing connecting said members whereby they rotate at successively increasing speeds, and a motor for driving one of said members, one of said members having a coating constituting a lure for flies.

3. A device of the class described, comprising a rotatable member constituting a lure for flies, and a pair of spaced, rotatable members adapted to receive flies from said first member and to advance the same to a predetermined part of said casing, gearing connecting said members, whereby said pair of members rotate in an opposite direction, and at a higher rate of speed than said first member, and a motor for driving said first member.

4. A device of the class described, comprising a casing, a cage removably associated therewith, a rotatable member having a fly-alluring coating and serving to carry flies into said casing, a pair of spaced rolls, a member for directing flies from said first member to said rolls, said rolls serving to direct flies to said cage, and means for driving said member and said rolls.

5. A device of the class described, comprising a casing having spaced side walls, a cage associated with said casing, rotatable members journaled in said casing, one of said members projecting partly from said casing and having a fly-alluring coating, a motor for driving said member, and means for directing flies from said projecting member to said other member to advance them to said cage, said other member rotating at a higher rate of speed than said first member.

6. A device of the class described, comprising a casing having spaced side walls, a cage associated with said casing, a cylinder member journaled in said casing and projecting partly therefrom, said cylinder member having a fly-alluring coating, a motor for driving said member, a member within said casing and serving to dislodge flies from said cylinder member, and a pair of spaced rotatable members adapted to receive flies therebetween.

7. A device of the class described, comprising a casing having spaced side walls, a cage associated with said casing and adapted to communicate interiorly therewith, a cylinder member journaled in said casing and projecting partly therefrom, said cylinder member having a fly-alluring coating, a motor for driving said member, a dislodging member mounted within said casing and serving to displace flies from said cylinder member, a pair of spaced rolls within said casing and adapted to receive therebetween flies from said dislodging member to direct the flies to said cage, and means for driving said rolls from said cylinder member.

8. A device of the class described, comprising a casing having spaced side walls, a cage associated with said casing and communicating therewith, a cylinder journaled upon the upper edges of said spaced walls, said cylinder having a fly-alluring coating, a motor for driving said cylinder, a pair of spaced rolls mounted within said casing and journaled between said side walls, a dislodging member mounted within said casing adjacent to said cylinder and serving to direct flies from said cylinder between said rolls, gearing operatively connecting said rolls, a pinion for driving one of said rolls, and a gear wheel associated with said cylinder and in mesh with said pinion.

In testimony whereof I have signed my name to this specification in the presence of two subscribing witnesses.

HENRY SAYLES.

Witnesses:
FLOYD C. CARR,
ALICE M. FULLER.

Copies of this patent may be obtained for five cents each, by addressing the "Commissioner of Patents, Washington, D. C."